United States Patent Office 3,509,597
Patented May 5, 1970

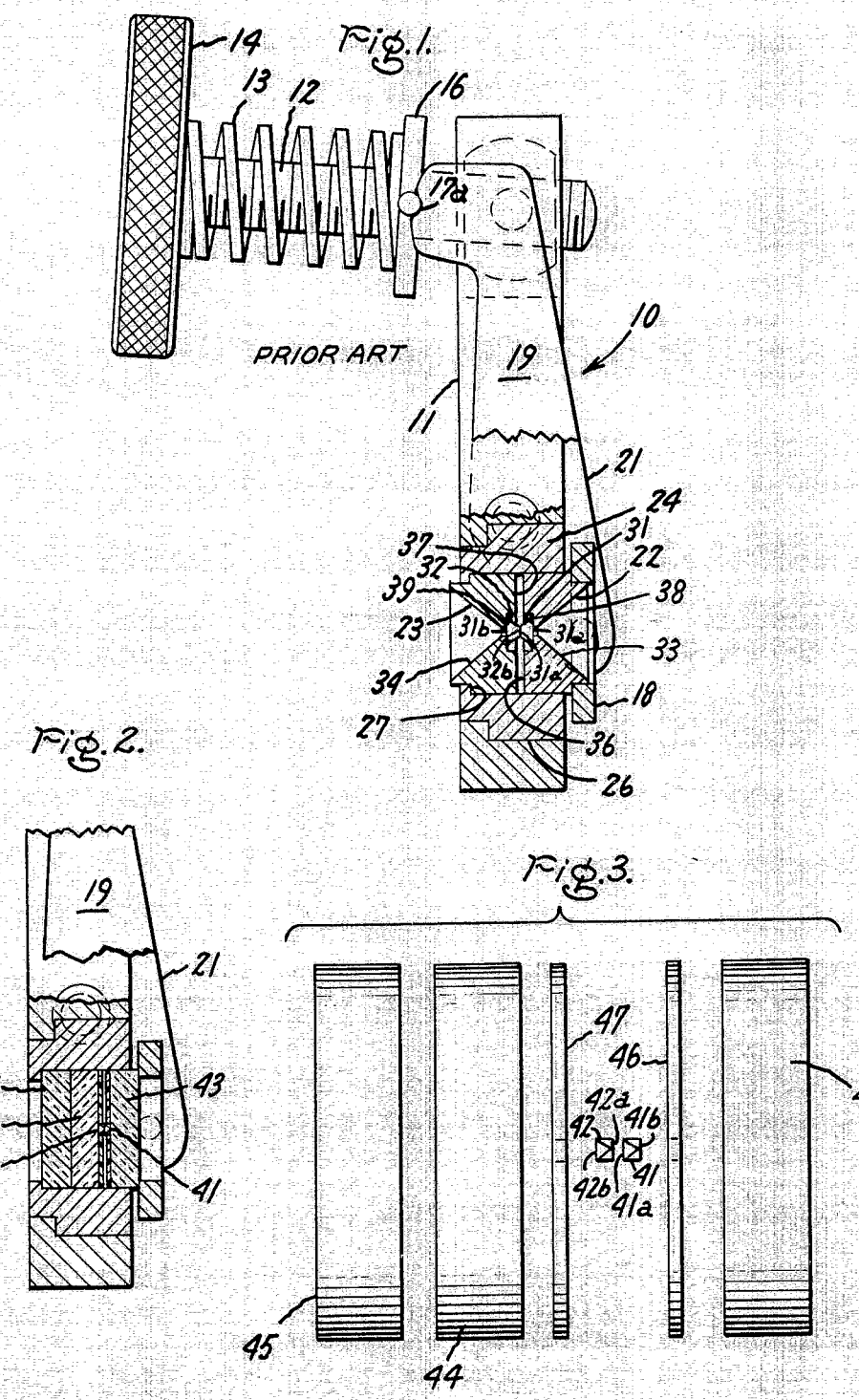

3,509,597
DIAMOND HIGH PRESSURE CELL
Robert S. Kirk, Scotia, N.Y., assignor to General Electric Company, a corporation of New York
Filed Jan. 2, 1968, Ser. No. 694,917
Int. Cl. B29c 3/00
U.S. Cl. 18—16.5                    9 Claims

ABSTRACT OF THE DISCLOSURE

An improvement is described in high pressure optical cells which employ diamond anvils for exerting very high pressures to specimens disposed therebetween whereby the specimen and phase change(s) brought about therein are visible during actual pressure application. The improved structure enables the use of inexpensive transparent natural unpolished diamond crystals in combination with inexpensive back-up means for supporting the opposed diamond crystals over the entire area of the face thereof opposite the juxtaposed faces, which apply pressure to the specimen. The back-up means for the diamonds are also transparent being of ordinary polished plate glass, such as a soda-lime or borosilicate glass.

BACKGROUND OF THE INVENTION

The instant invention is an improvement over the high pressure optical cell disclosed in U.S. Patent 3,079,505—Weir et al. wherein two modified gem-cut type II diamonds, each weighing 0.036 gram, comprise the anvil elements. The culets of each diamond must be ground off to form small flat surfaces, which may be disposed parallel to each other with the specimen placed therebetween. The holder for each diamond is bored out conically to permit the introduction of maximum infrared radiation flux to and through the diamond to the specimen. Diamonds fulfilling the criteria recited in U.S. 3,079,505 are not very common and such crystals are, therefore, even more expensive in large size than type I crystals of comparable size.

In practice, the substance to be studied, in the form of a fine powder, is inserted between the small flat surfaces formed by grinding off the culets of the aforementioned diamonds and, after assemblying the balance of the cell, load can be applied to the diamond anvils such that tremendous forces are exerted between the juxtaposed diamond surfaces and are, therefore, applied in turn to the powdered substance. In performing spectrum analyses, while the substance being studied is subjected to selected high pressures, the cell, which will have been positioned in the focal point region of a conventional beam-condensing unit, will be scanned by the beam over some preselected spectrum. The rays passing through the diamond cell and pressurized specimen are received by suitable instrumentation, such as a spectroscope for analysis.

In order to apply force to the rear of each diamond and still maintain an open line of sight through the diamond cell, pressure is applied over only a small portion of the area of the rear face of the diamond, pressure transmission to the diamond being by means of a hollow holder coming in contact therewith over a ring-like area. Such a load application, of course, subjects each diamond crystal to unnecessarily severe strains. High quality, polished, relatively large diamonds specifically contoured are required for such a structure and great care must be taken in use of the apparatus, because a broken diamond anvil will make for very costly experimentation.

In contrast to the aforementioned construction, the instant invention combines the high compressive strength and precise dimensions of two materials readily available without need for expensive preparation thereof; namely, natural diamond crystals and polished plate glass. By using these materials a diamond high pressure cell has been constructed that is so inexpensive that one may consider making a new cell for each experiment. The cell allows samples to be subjected to pressures in the 50 kilobar and higher range, while observations may be made optically or by spectrum analysis of the specimen under pressure.

SUMMARY OF THE INVENTION

In accordance with the instant invention the diamond high pressure cell preferably comprises two natural unpolished diamond crystals, which have smooth surfaces and are free from inclusions (when observed under X–50 magnification), these crystals being compressed together as anvils between transparent plate glass surfaces, which fully support and exert pressure against the entire rear face of the diamond crystal anvils.

BRIEF DESCRIPTION OF THE DRAWING

Other objects, features and advantages of the invention will appear more clearly from the following detailed description of the preferred embodiment thereof made with reference to the drawings in which:

FIG. 1 is an elevational view partially in cross-section, of a conventional pressure applying device fitted with a high pressure cell as disclosed in U.S. 3,079,505;

FIG. 2 is a portion of the device of FIG. 1 in which the prior art high pressure cell has been replaced by the high pressure cell of the instant invention; and FIG. 3 is an exploded view showing the diamond anvils and back-up support therefor for the high pressure cell of this invention.

DESCRIPTION OF THE PREFERRED EMBODIMENT

Referring now to the drawings, wherein like reference characters designated like or corresponding parts throughout the several views, there is shown in FIG. 1 a prior art diamond anvil cell assembly in place in a conventional pressure applying structure 10. Casing 11 of structure 10 is preferably composed of cold-rolled steel and may, for example, be about 1″ thick, 3 inches wide and 6 inches long, a size suitable for mounting in a conventional beam condensing unit (not shown). Spindle 12 threadingly inserts into a bushing in the upper portion of casing 11. A calibrated spring 13 is positioned concentric about the spindle 12, spring 13 abutting a head 14 integral with said spindle at one end thereof and abutting annular collar 16 at the other end. Projecting to the side from collar 16 are stub shafts 17a, 17b, only one of which is shown. Pressure plate 18 is positioned adjacent to the opposite surface of casing 11 and the stub shafts 17a, 17b are interconnected with pressure plate 18 by a lever arrangement on each side of casing 11 whereby the arms 19, 21 are pivotally connected to the sides of casing 11. The location of the pivot points are selected to provide proportional lengths productive of desired pressure ranges in combination with compression spring 13.

The pressure plate 18 bears against a first diamond holder 22, plate 18 being bored out to permit passage therethrough of the convergent cone of irradiation, which is to pass through holders 22, 23, respectively. Bearing 24 inserts into a bushing 26 in the lower portion of casing 11, the first and second diamond holders 22, 23 being positioned in back-to-back relationship with bearing 24 and being free to slide therein and be urged against shoulder 27 formed in bearing 24.

In operation pressure plate 18 is perpendicular to the diamond anvils 31, 32. This ensures the absence of components of force at right angles to the thrust axis and uniaxial force is, therefore, applied to any specimen contained between juxtaposed flat surfaces of the diamonds.

In accordance with U.S. 3,079,505 the diamond anvils 1, 32 are required to be gem-cut type II diamonds each weighing 0.036 gm. (1 carat=.2 gm.). In addition to requiring the ordinary polishing operations to produce the gem contour shown, the culets normally present at the tip of such a configuration must be ground off to form small flats 31a, 32a, parallel to surfaces 31b, 32b, respectively. Diamond anvils 31, 32 are seated in recesses 33, 34 respectively with flats 31a, 32a in juxtaposition projecting beyond opposed surfaces 36, 37 of holders 22, 23, respectively. Rubber rings 38, 39 may be used to permit alignment of the diamond anvils under pressure. Operating pressure is applied over a ring-like area to face 31b by the bottom of recess 33; similar pressure is generated over a ring-like area between face 32b and the bottom of recess 34. In this manner a centrally-located area of each of faces 31b, 32b is open for the transmission of radiant energy to and from the specimen (not shown) which would be located between faces 31a, 32a.

The load imposed during operation is determined by measuring the compression of spring 13 and the pressures are calculated by dividing the load exerted by plate 18 by the area of the smaller of the two faces 31a, 32a (which each have an area of about 0.002 in. or less). By using diamond anvils with smaller area faces 31a, 32a, higher pressures can be generated in the specimen using the same basic equipment.

The improved diamond pressure cell of the instant invention recognizes for the first time that the unaltered surfaces of small and inexpensive naturally occurring diamond crystals can be perfect enough for use as diamond anvils. Such diamond crystals (both type I and type II) are generally too small to be mounted in holders such as are found in conventional apparatus, because it would be impossible to retain sufficient freely observable area for optical viewing or spectrum analysis. Any useful means for supporting these small diamonds also would have to be inexpensive so as not to dilute the benefits provided by the above discovery. Just such a support means has been found. This support means is (a) transparent, (b) readily available with parallel optically true surfaces, (c) able to withstand highly concentrated load applications and still provide effective optical transmission even in regions of highest stress gradients and (d) able to fully support the rear face of each of the small opposed diamond anvils. This material is common plate glass, particularly borosilicate plate glass. Plate glass in ordinary parlance means rolled sheets of glass (or drawn sheets of glass) ground and polished on both sides to plane surfaces, optically true. Such, for example, is the material of which plate glass mirrors are made. The glass composition may be those known as soda-lime, soda-lime-silica, lead, borosilicate, 96% silica or 100% fused silica.

Even though at higher pressures (over 40 kilobars) cracks develop in these glass back-up discs in the region of highest stress gradient, as may be expected, in the polished plate glass discs of thickness in excess of 3/32" for borosilicate glass or about 1/8" for other plate glasses such cracks do not propagate far enough into the glass back-up discs to impair the support capabilities thereof and they are so inexpensive that they can be readily replaced with new glass discs for future experiments. These back-up discs are easily prepared by merely cutting round plugs from a larger plate glass sheet.

One method of comparing the instant invention with the arrangement disclosed in Weir et al. is by comparing the size and cost of the diamond anvils employed. In the instant invention octahedra of industrial quality weighing about 0.01 carat (costing about $.50 each at wholesale prices) or macles (twin diamond crystals) of industrial quality weighing about 0.1 carat (costing about $5.00 each at wholesale prices) are used. Weir et al. require gem quality stones weighing about 0.2 carat (costing upwards of $100 wholesale for type I). Still further, for spectrum analysis, which is the main concern in the Weir et al. patent, type II diamonds are required. Type II diamonds in sizes as large as 0.2 carat are most uncommon so that the cost would be more than double the cost of type I diamonds of equivalent weight.

In the size diamond required in the instant invention both type II octahedra and type II macles are plentiful and are not at a premium. If the radiation source is in the ultraviolet region the construction described herein requires only that type II diamond anvils be used in combination with 100% silica plate glass, sometimes referred to as quartz glass, in place of the regular plate glass back-up discs. On the contrary, if infared radiation at wavelengths up to 3.5 microns is employed for the spectrum analysis, the type II diamond anvils would be provided with 100% silica plate glass, and for longer wave length infrared radiation it would be necessary to resort to other backup materials known to exhibit transparency to longer wave lengths. Even this requirement does not increase the cost of the diamond cell of this invention to the point that it cannot readily be considered a disposable item for spectrum analysis.

In one embodiment of this invention, two diamond octahedra measuring about one millimeter across are compressed together (with a specimen located therebetween) along their 111 directions. These opposed diamond crystals 41, 42 (as shown in FIGS. 2 and 3) are forced together by pressure applied to backup plugs 43, 44, 45 of Pyrex plate glass (81% $SiO_2$, 13% $B_2O_3$, 3.6% $Na_2O$, 0.2% $K_2O$ and 2.2% $Al_2O_3$). Rings 46 and 47 are usually employed in the case of octahedra diamonds in order to aid in proper crystal orientation. However, these rings, which may be made of polytetrafluoroethylene, are not essential.

The octahedra, which occur as natural crystals and do not require alteration for use as anvils, weigh about 0.01 carat.

The perfection of the crystal surfaces in naturally occurring diamond octahedra crystals and the easily obtainable plate glass plugs with parallel optically true surfaces permit the cell to be assembled simply and without the need for guiding or polishing of its components. The only alignment of the diamonds which is required is to orient the juxtaposed diamond faces 41a and 42a relative to each other by rotation such that the contact area therebetween is smaller than the contact areas between face 41b and glass plug 43 and between face 42b and glass plug 44. The crystal disposition shown in FIG. 3 represents a 60° rotation. In this way, pressures may be tolerated between the diamond crystals that are higher than the pressures between the diamonds and the glass. With the massive support of the glass backup plates, the practical limit of the pressure between diamond anvils easily exceeds 45 kilobars.

In a modified version providing the best compromise of convenience and cost, the cell may be constructed employing a natural diamond macle and a single octahedron. Preferably the macle (about 0.1 carat) selected is somewhat larger than that of the opposing octahedron (about 0.01 carat) in which case the problem of positioning the sample between the diamonds is greatly simplified and rings 46, 47 may readily be eliminated.

If desired, still another modification may be employed wherein one cut and polished diamond of the configuration shown in U.S. 3,079,505 having a flat about 0.5 millimeter across is employed in combination with a diamond macle larger in face area than the area of the flat. Numerous tests have shown that most failures of the diamond anvils in this type of high pressure cell occur in that diamond anvil face having the larger surface. Therefore, the use of macles which are very inexpensive restricts breakage if it should occur, to the inexpensive macle, rather than to the cut and polished anvil.

All configurations described hereinabove have been shown capable of achieving at least 47 kilobars of pressure with ease between anvils. The 47 kilobar level was detected in calibrating the device, since at this pressure level a transformation occurs in cuprous bromide. Several solid-solid transformations in the silver and cuprous halides, in the elements bismuth, selenium, tellurium and cesium all occur in this general magnitude of pressure level and may be studied at minimum expense with the diamond pressure cell of this invention.

What I claim as new and desire to secure by Letters Patent of the United States is:

1. In a device for optically observing high pressure phenomena wherein means are provided for producing force; a pair of transparent diamond anvils each having first and second flat faces parallel to each other, are mounted with the first flat faces thereof in parallel juxtaposition to each other such that under the application of force to the second flat faces of said diamond anvils the first flat faces may be urged toward each other, and means are provided for coupling force from the force producing means to the diamond anvils, the improvement comprising:
   (a) at least one of the diamond anvils being a substantially unaltered natural diamond crystal and in combination therewith,
   (b) a thick transparent disc of plate glass in contact with each said natural diamond anvil over the entire second flat face thereof for the transmission of pressure thereto.

2. The improvement substantially as recited in claim 1 wherein one diamond anvil is a gem quality diamond and the second diamond anvil is an industrial quality macle.

3. The improvement substantially as recited in claim 1 wherein each diamond anvil is an octahedron.

4. The improvement substantially as recited in claim 1 wherein each diamond anvil is an octahedron and the plate glass discs are of borosilicate glass.

5. The improvement substantially as recited in claim 1 wherein one diamond anvil is a macle and the plate glass discs are of borosilicate glass.

6. The improvement substantially as recited in claim 1 wherein one diamond anvil is an octahedron, the other diamond anvil is a macle and the plate glass discs are of borosilicate glass.

7. In a device for studying high pressure phenomena by spectrum analysis wherein means are provided for producing force, a pair of transparent diamond anvils are mounted with the first flat faces thereof parallel juxtaposition to each other such that under the application of force to the second flat faces of said diamond anvils the first flat faces may be urged toward each other, and means are provided for coupling force from the force producing means to the diamond anvils, the improvement comprising:
   (a) the diamond anvils being substantially unaltered natural type II diamond crystals each having a second flat face parallel to the juxtaposed faces and in combination therewith,
   (b) thick transparent discs of 100% silica plate glass in contact with each of said type II diamond anvils over the entire second flat faces thereof for the transmission of pressure thereto.

8. The improvement substantially as recited in claim 7 wherein each diamond is an industrial quality octahedron.

9. The improvement substantially as recited in claim 7 wherein one diamond anvil is an industrial quality octahedron and the other diamond anvil is an industrial quality macle.

References Cited

UNITED STATES PATENTS

| | | | |
|---|---|---|---|
| 3,079,505 | 2/1963 | Weir et al. | 250—83 |
| 3,088,169 | 5/1963 | Wentorf. | |
| 3,249,753 | 5/1966 | Barnett et al. | 250—51.5 |

OTHER REFERENCES

"Miniature Diamond Ultrahigh Pressure Cell Adapted for In-reactor Irradiation Studies" from The Review of Scientific Instruments, vol. 37, No. 7, pp. 871–873, July 1966.

J. HOWARD FLINT, JR., Primary Examiner

U.S. Cl. X.R.

250—51.5, 83; 356—51, 244